Aug. 26, 1958           G. MARTIN           2,848,937

AUTOMATIC CORN POPPING MACHINE

Original Filed March 29, 1950           7 Sheets-Sheet 1

INVENTOR.
GAYLE MARTIN
BY
Wheeler, Wheeler + Wheeler
Attorneys

Aug. 26, 1958
G. MARTIN
2,848,937
AUTOMATIC CORN POPPING MACHINE
Original Filed March 29, 1950
7 Sheets-Sheet 3
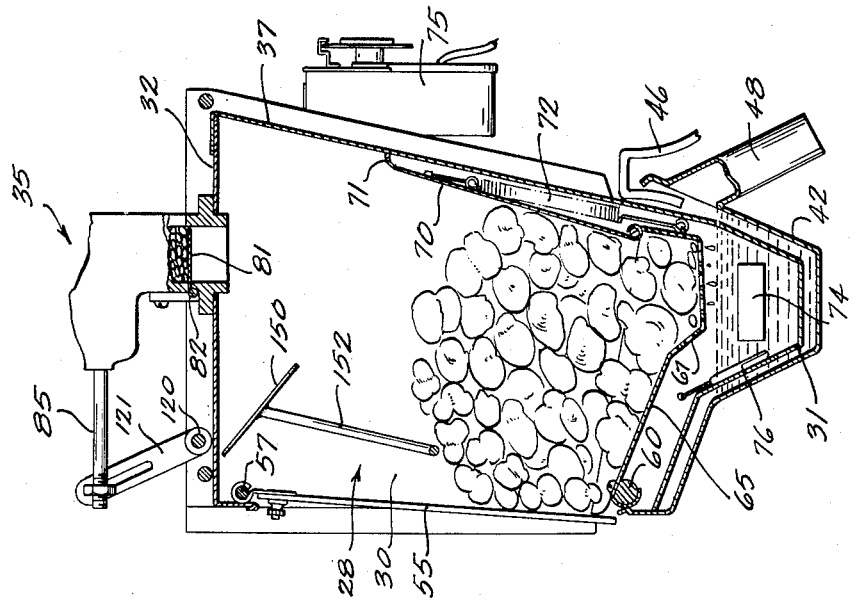
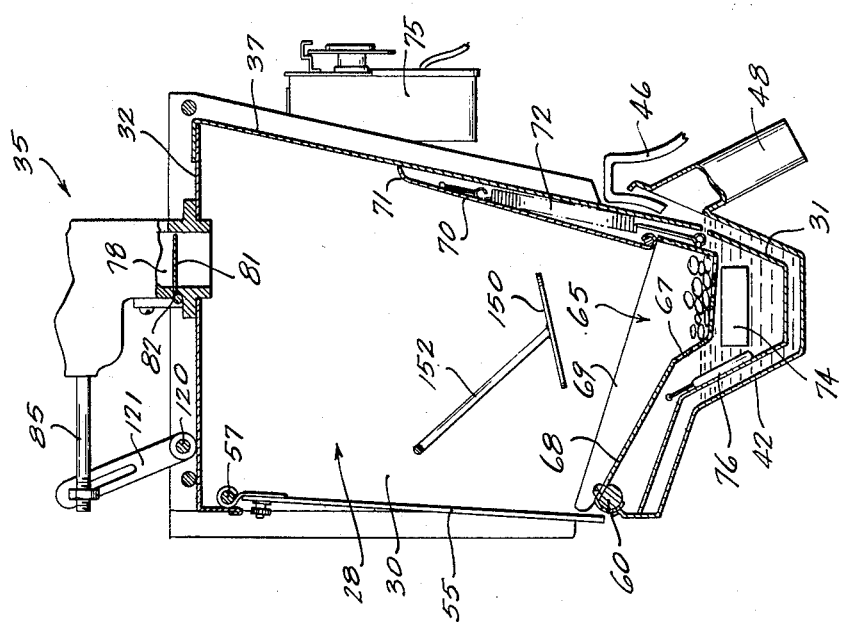
INVENTOR.
GAYLE MARTIN
BY
Wheeler, Wheeler & Wheeler
Attorneys Aug. 26, 1958　　　　　　　G. MARTIN　　　　　　　2,848,937
AUTOMATIC CORN POPPING MACHINE
Original Filed March 29, 1950　　　　　　　7 Sheets-Sheet 4
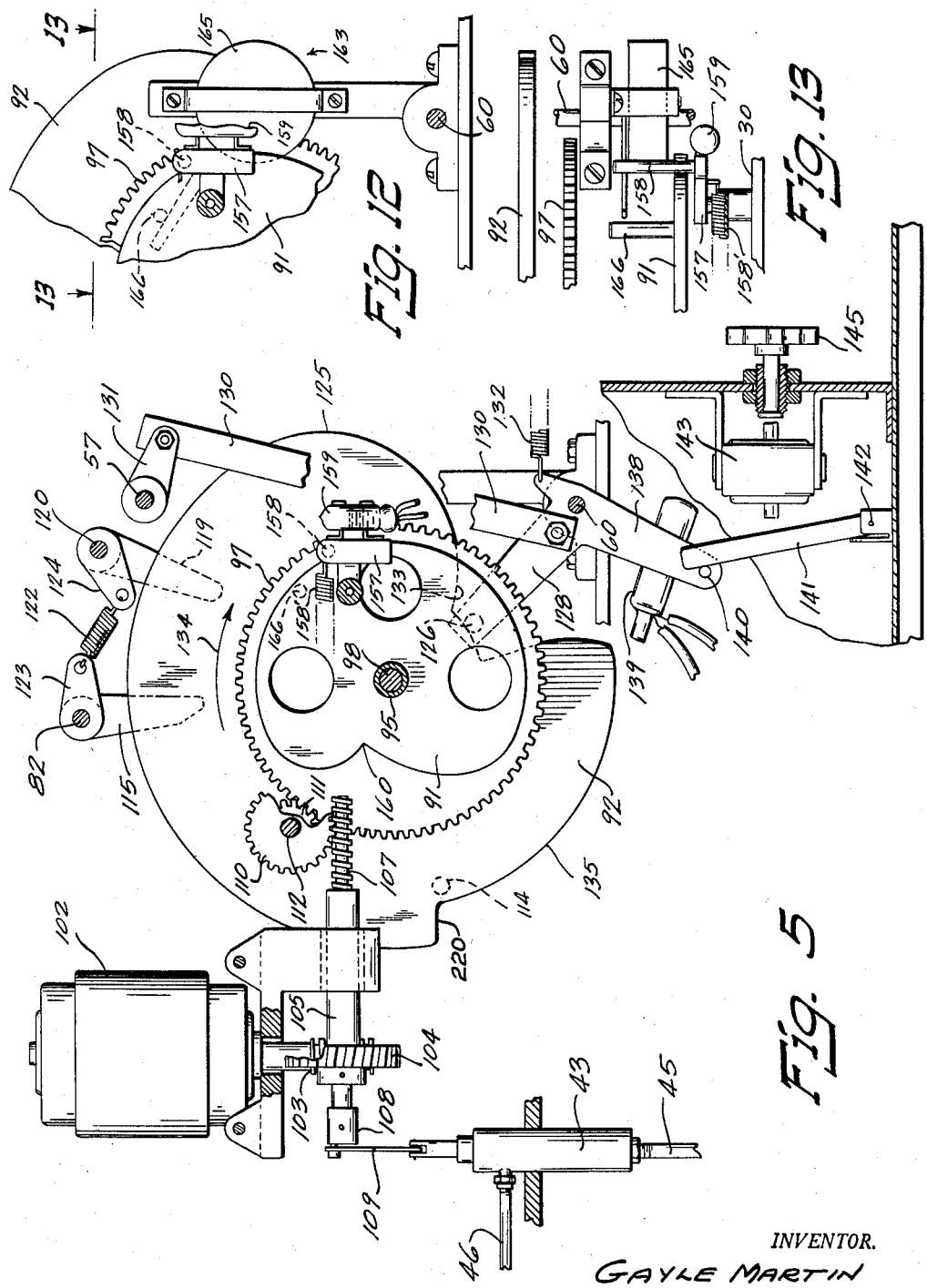
INVENTOR.
GAYLE MARTIN
BY
Wheeler, Wheeler & Wheeler
Attorneys Aug. 26, 1958 G. MARTIN 2,848,937
AUTOMATIC CORN POPPING MACHINE
Original Filed March 29, 1950 7 Sheets-Sheet 5

INVENTOR.
GAYLE MARTIN
BY
Wheeler, Wheeler & Wheeler
Attorneys

Aug. 26, 1958 G. MARTIN 2,848,937
AUTOMATIC CORN POPPING MACHINE
Original Filed March 29, 1950 7 Sheets-Sheet 6

INVENTOR.
GAYLE MARTIN
BY
Wheeler, Wheeler & Wheeler
Attorneys

Aug. 26, 1958  G. MARTIN  2,848,937
AUTOMATIC CORN POPPING MACHINE
Original Filed March 29, 1950  7 Sheets-Sheet 7
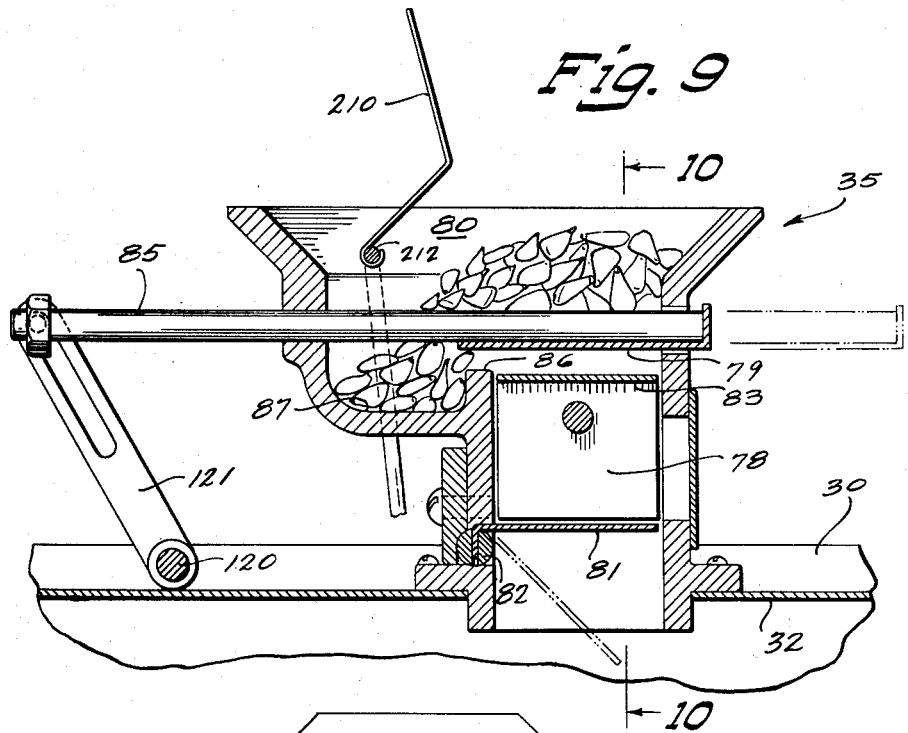
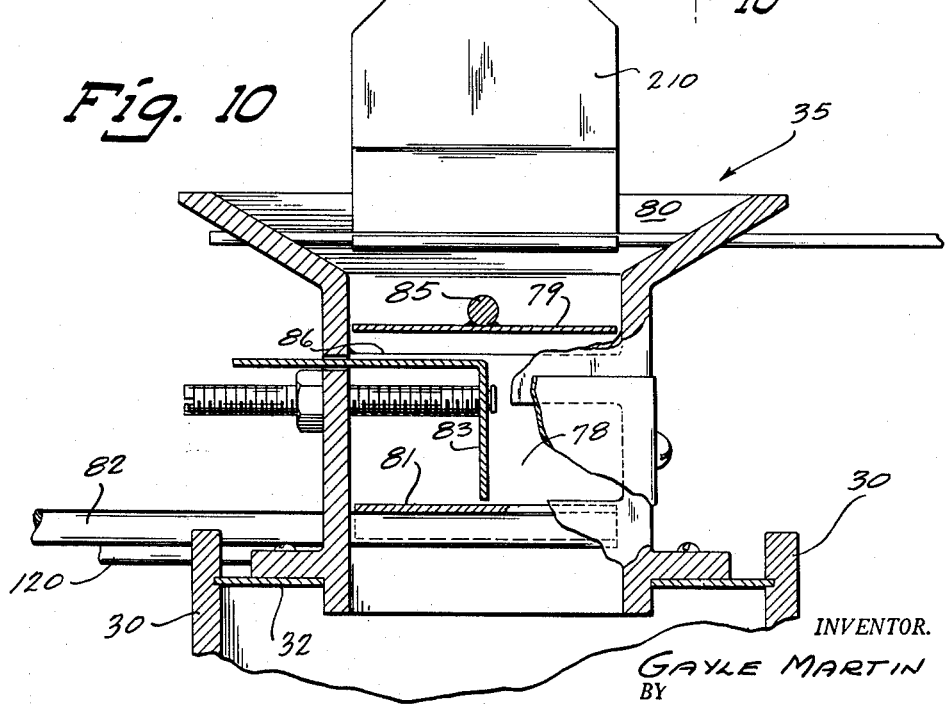
INVENTOR.
GAYLE MARTIN
BY
Wheeler, Wheeler & Wheeler
Attorneys United States Patent Office 2,848,937
Patented Aug. 26, 1958

2,848,937

AUTOMATIC CORN POPPING MACHINE

Gayle Martin, Milwaukee, Wis.

Original application March 29, 1950, Serial No. 152,564, now Patent No. 2,674,936, dated April 13, 1954. Divided and this application February 23, 1954, Serial No. 411,831

12 Claims. (Cl. 99—238.3)

This application relates to automatic controls for an automatic corn popping machine.

This application is a division of my copending application Serial No. 152,564, filed March 29, 1950, now Patent No. 2,674,936, for an Automatic Corn Popping Machine.

The objects of this invention are generally the same as those stated in my co-pending application aforesaid. This application, however, relates more specifically to details of construction and electrical circuits for controlling the machine as follows:

In one aspect the invention relates to the electrical control circuit for the motor and heater of the machine. The circuit includes branch circuits in which the motor and heater are connected in parallel, the motor branch including a first switch in series with the motor whereby the motor may be de-energized independently of the heater, and a second switch in series connection with both branches for simultaneous control of the motor and heater.

In another aspect the invention relates to an oil pump which circulates oil to the heater and is actuated by the motor in such a manner that oil is circulated only before and after the corn popping basket is in popping position, the pump and oil circulation being shut off, however, during popping. Thus the oil bath is cooled except during popping, when the oil bath is raised to proper popping temperature.

In another aspect the invention relates to a special safety switch and means for its actuation responsive both to the level of oil in the oil storage tank and to the level of unpopped corn in a feed hopper. Thus machine operation is terminated automatically if the supply of either the oil or unpopped corn drops below a predetermined level.

In another aspect the invention relates to a novel umbrella mounted over the corn popping basket and yieldable upwardly under pressure of expanding popped corn whereby the umbrella will actuate a switch to deactuate the heater and actuate the motor to move the basket to its ejecting position.

In another aspect the invention relates to a novel feed hopper and measuring chamber therebelow, the gate between the hopper and chamber closing a yielding mass of unpopped corn. In this manner I eliminate the possibility of a kernel wedging between the gate and an unyielding wall against which the gate might otherwise close to wedge the gate open.

In the drawings:

Fig. 3 is a view similar to Fig. 2 showing the popping chamber and basket, with the basket in popping position;

Fig. 4 is a view similar to Fig. 3 but showing the basket in draining position;

Fig. 5 is a cross-section taken on the line 5—5 of Fig. 1, looking in the direction of the arrows, and showing the operating mechanism;

Fig. 9 is an enlarged detail of the corn feed hopper per se and is an enlarged cross-section taken on the line 2—2 of Fig. 1;

Fig. 10 is a cross-section taken on the line 10—10 of Fig. 9, looking in the direction of the arrows.

Fig. 12 is an enlarged fragmentary view of a portion of the device shown in Fig. 5, time clock omitted in Fig. 5 being diagrammatically illustrated.

Fig. 13 is a fragmentary cross section taken along the line 13—13 of Fig. 12.

Figure 1:
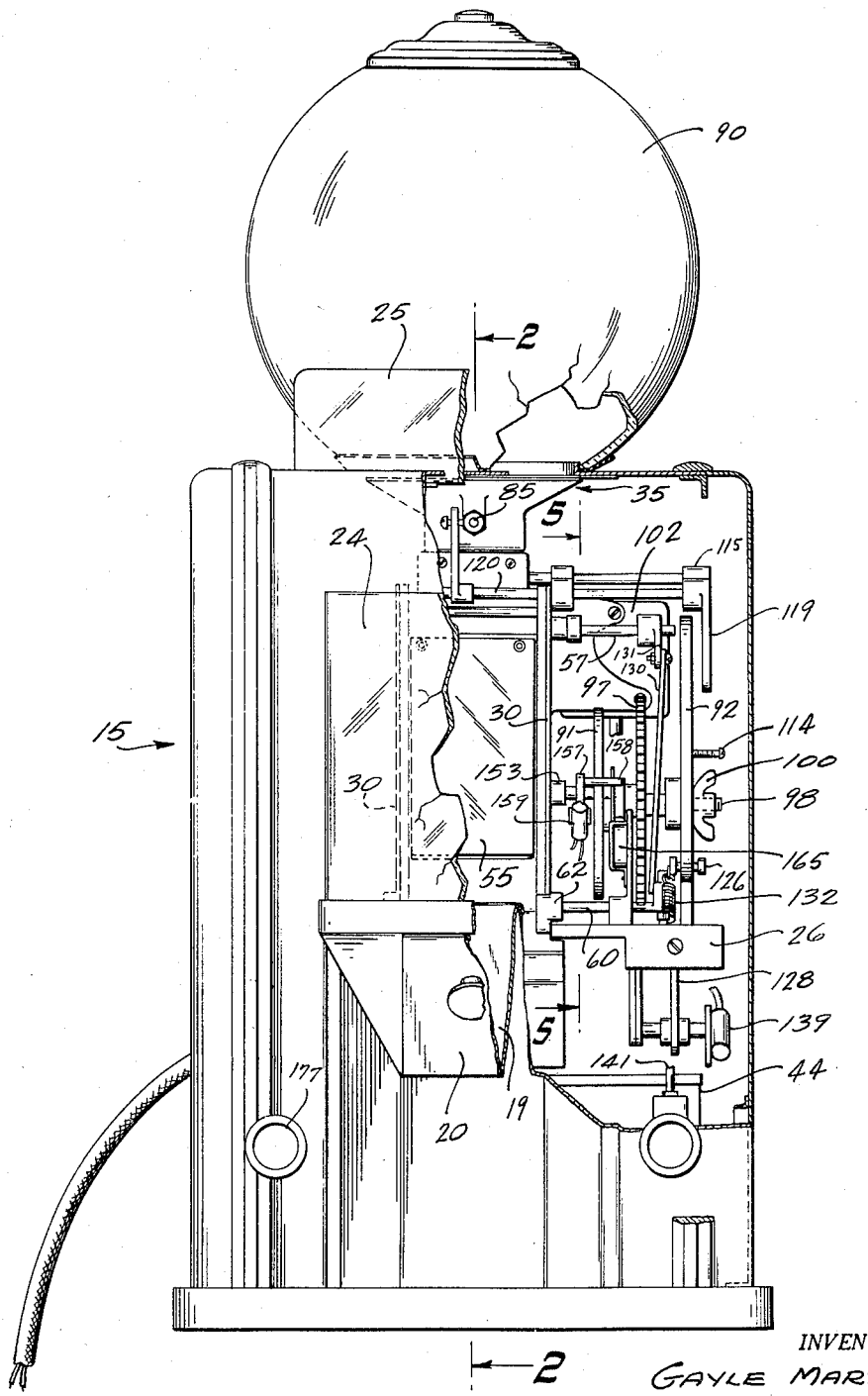
Fig. 1 is a front elevational view of a machine embodying the present invention, parts thereof being broken away to more clearly illustrate certain other parts.

Referring to the drawings, the popcorn machine is housed in a case 15 (Figs. 1 and 2) which is roughly rectangular in shape with a tapered recess 16 in the front. The recess 16 has an opening 17 through which the popped corn is ejected.

The popped corn is received in a hopper 19 in the lower part of the recess 16 directly below the opening 17. The hopper 19 has a door 20 which is normally held closed by a spring 22. A transparent plastic cover 24 is provided for the upper part of the recess 16 above the hopper 19 to enable the purchaser to view the corn during popping. A plastic name plate 25 may be inserted in a slot in the top of the machine.

The popping mechanism is supported in the case 15 on arms 26 which are carried on ledges (not shown) in the case.

Figure 2:
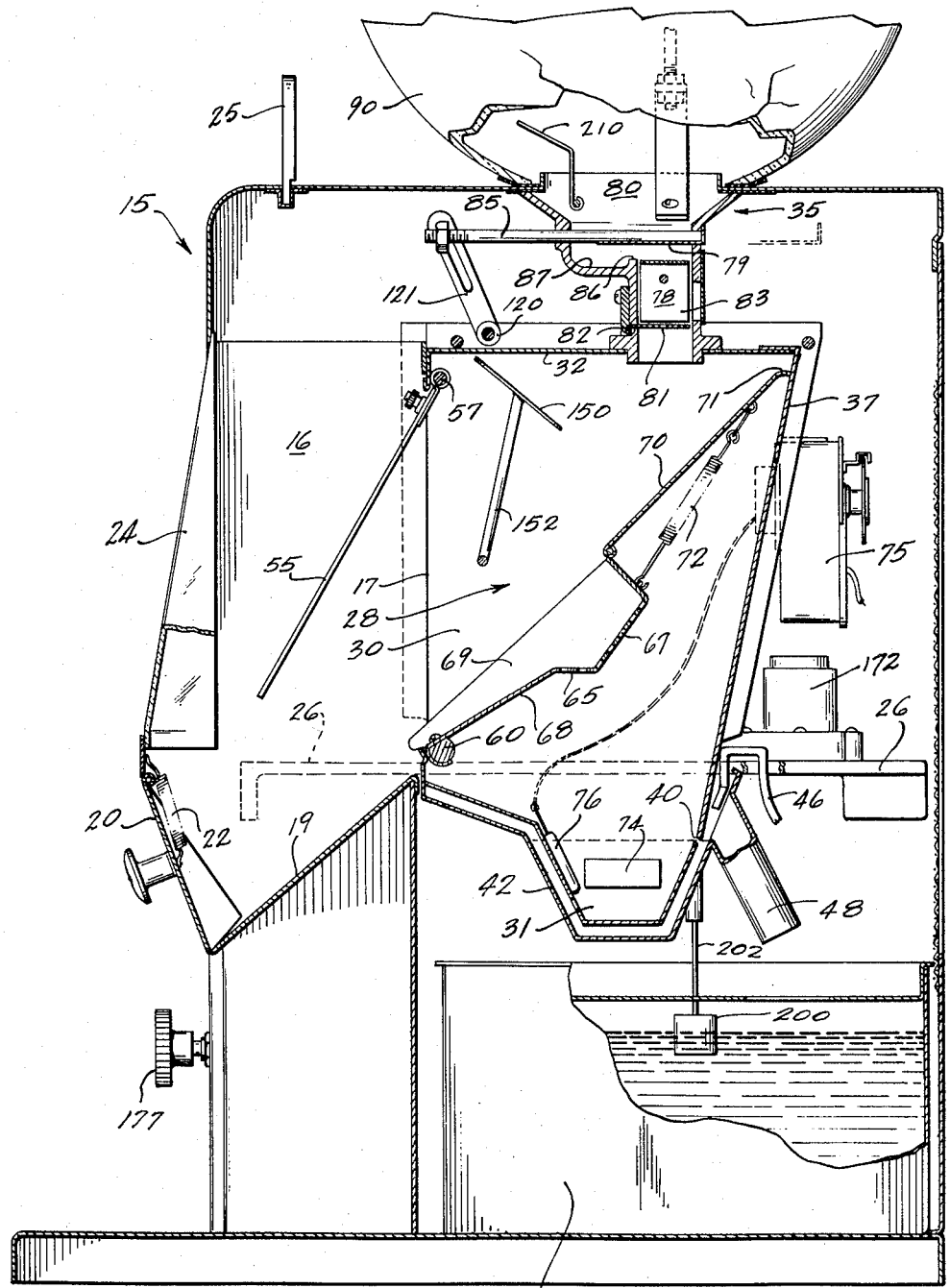
Fig. 2 is a longitudinal cross-section taken on the line 2—2 of Fig. 1, looking in the direction of the arrows, and showing the basket in dumping position.

The arms 26 support a popping chamber 28 which chamber is best shown in Figs. 2, 3 and 4. Referring to Figs. 2, 3 and 4, the popping chamber 28 is made of a pair of parallel vertical side walls 30—30 having an extension on the lower end to provide a cooking chamber 31.

The side walls 30—30 are joined by a top wall 32 which extends between the side walls and has an opening therein to receive the corn hopper, generally designated 35. The rear of the chamber 28 is enclosed by a rear wall 37 which extends around the bottom to enclose the cooking chamber 31. The wall 37 has a slit opening 40 adjacent the bottom of the chamber 31 to admit oil from a well 42.

The well 42 envelopes the lower part of the cooking chamber 31 and receives cool oil pumped by a positive displacement pump 43 (Fig. 5) from an oil reservoir 44 (Fig. 2) through oil pipes 45 and 46. Excess oil returns to the reservoir 44 by gravity through an overflow pipe 48.

The front end of the popping chamber 28 is open and is covered by a glass door 55 which is mounted on a shaft 57. The shaft is mounted to pivot in bearings in the upper edge of the side plates 30 adjacent the front of the machine.

The manner of operating the pump 43 and rotating the shaft 57 to open and close the glass front 55 of the popping chamber 28 will be given in detail below.

A second shaft 60 is mounted to rotate in bearings 62 in the lower part of the popping chamber 28. The shaft 60 carries a popping basket 65.

The popping basket 65 comprises an open top metal basket having openings 67 in the bottom thereof adapted to admit hot oil from the cooking chamber 31. A tray 68 having upturned sides 69 forms the handle for the basket. The tray 68 is secured to the shaft 60 and is adapted to be rotated thereby from a popping position shown in Fig. 3 wherein the bottom of the basket is immersed in the oil in the cooking chamber 31 to a drain position shown in Fig. 4 in which the basket is entirely out of the oil and thence to a discharge position shown in Fig. 2 in which the popped corn is discharged into the hopper 19.

The popping basket 65 has a plate 70 hinged on the rear end thereof. The plate has a curved upper tip 71 which is in constant contact with the rear wall of the popping chamber 28, being held in contact with the rear wall 37 by a tension spring 72 mounted between the plate 70 and the basket 65.

The basket 65 and plate 70 both extend across the width of the popping chamber so that at no time and under no circumstances can kernels of corn become lodged under the popping basket.

The oil in the cooking chamber 31 is heated by means of a heating coil 74 which is mounted between the bottom portion of the side walls 30—30 in the oil in the cooking chamber 31 directly below the lowest position of the basket 65. The heat supplied to the oil in the cooking chamber is regulated by a thermostat 75 including a thermo-couple 76 in the oil.

Corn is supplied to the popping basket from a measuring hopper, generally designated 35, located above the popping chamber 28 and projecting through the upper wall 32 thereof. The measuring hopper 35 comprises a measuring chamber 78 (see Figs. 9 and 10) having a sliding inlet gate 79 to admit corn to the chamber from a supply chamber 80. A discharge gate 81 is fixed to and pivots with a shaft 82 to discharge the corn into the popping basket 65. A manually adjustable baffle 83 regulates the amount of corn in the measuring chamber.

The gate 79 is mounted on a reciprocable rod 85 and is adapted to move between the corn in the measuring chamber 78 and the corn in the supply chamber 80.

The supply chamber 80 as seen in Fig. 2 is somewhat wider than the measuring chamber 78 and is provided with an upstanding transverse rib 86 extending above the bottom 87 of the supply chamber 80 and below the sliding gate 79.

The provision of the upstanding rib 86 above the bottom of the chamber 80, and the enlargement of the chamber 80 above and below the level of the slide 79 at the side of the chamber toward which the slide closes permits the gate 79 to shut under all conditions while at the same time gives an exact measurement for the corn delivered from the measuring chamber 78. The gate closes easily and positively because it closes against a yielding mass of corn, and not against a solid wall against which a kernel might otherwise wedge to hold the gate open.

The upper end of the supply chamber is open and receives corn from a bowl 90 which may be filled with corn to insure a constant supply thereof to the hopper.

The mechanical movements of the machine are all performed by electric motor through the medium of a pair of cams 91 and 92 (see Fig. 5). The cams 91 and 92 are fixed on a common sleeve 95 which also has a driving gear 97 secured thereon between the cams 91 and 92. The cam assembly, including the sleeve 95, the cams 91 and 92 and the driving gear 97, is rotatably mounted on a fixed shaft 98 formed on the outside of the popping chamber 28 and is secured thereon by a nut 100 (Fig. 1).

The cam assembly is driven from a motor 102 mounted at the rear of the popping chamber, and preferably carried by the side wall 30 of the chamber. The motor drives a worm 103 which drives a worm wheel 104 which turns a shaft 105 on one end of which is a worm 107 and on the other end of which is an eccentric 108 which reciprocates the pump 43 through a connecting rod 109.

The worm 107 drives a worm wheel 110 which rotates a gear 111 through a common shaft 112. The gear 111 turns the driving gear 97 which actuates the cams 91 and 92.

The outside cam 92, which is somewhat larger than the inside cam 91, controls emptying of the corn hopper 35 and the refilling thereof through a pin 114 which is fixed on the outside of the cam 92 and rotates about the shaft 98 with the cam. The pin 114 contacts a lever 115 fixed on the shaft 82 to rotate the shaft 82. Upon rotation of the shaft 82 the gate 81, which is fixed to the shaft 82, opens to allow corn in the measuring chamber 78 to drop into the popping basket 65.

The pin 114 also moves a second lever 119 to rotate a shaft 120. Rotation of the shaft 120 moves a lever 121 which actuates the rod 85 to open the sliding gate 79 to refill the measuring chamber 78. A tension spring 122 connected between arms 123 and 124 on the levers 115 and 119, respectively, constantly urges the gates 81 and 79 into closed positions.

The cam element 92 has a cam surface, generally designated 125, on the periphery thereof. A cam follower 126 rides on the cam surface 125 to actuate a lever 128. The lever 128 is fixed on the shaft 60 so that movement of the lever 128 rotates the shaft 60 to move the popping basket 65.

The lever 128 has a link 130 pivoted thereto which actuates a lever 131 fixed to the shaft 57, so that movement of the lever 128 also rotates the shaft 57 to open and close the glass door 55 to the popping chamber 28. A spring 132 constantly urges the cam follower 126 toward the center of the cam 92.

The combined action of the lever 128 upon the popping basket 65 and the glass door 55, as the cam rotates, is to move the basket from its discharge position and the door 55 from its open position at the start of the operation with the follower 126 in a recess 133 to positions where the basket 65 is in popping position in the oil and the door 55 is closed, as the cam moves in the direction of the arrow 134 (Fig. 5). As the follower 126 drops onto the intermediate portion 135 of the cam 92 the door 55 is retained substantially closed and the basket 65 is lifted out of the oil to drain excess oil from the corn. When the follower 126 again drops into the recess 133, the door 55 is opened by the link 130 and at the same time the basket 65 is snapped to discharge position (as seen in Fig. 2) causing the corn to fall into the hopper 19.

The lever 128 has an arm 138 formed thereon which arm 138 carries a mercury tube switch 139 and a pin 140. The switch 139 is adapted to move to "on" or closed position as the follower 126 is moved away from the shaft 98 by the rotation of the cam 92 and to "off" or open position as the cam follower 126 drops into the recess 133. The switch 139 remains closed during the time the follower 126 is riding on the intermediate portion 135 of the cam 92.

The pin 140 is adapted to contact a lever 141 which lever is pivoted at 142, to force the lever into contact with a switch 143 to open the latter switch after the mercury switch 139 closes. The switch 143 is closed to start the operation of the machine by pressing a button 145 on the outside of the casing 15.

The second cam 91 is adapted to cooperate with an umbrella 150 to control the operation of the motor during the popping. The umbrella 150 is carried within the popping chamber 28 by a rod 152 which passes through a horizontal bearing 153 in the side 30 of the popping chamber 28 and bends downward to carry the umbrella 150 adjacent the lower central portion of the popping chamber.

Outside the popping chamber the rod 152 receives a block 157 (Fig. 5) to which it is affixed. The block 157 has a cam follower 158 which contacts the outer peripheral surface of the cam 91. The follower 158 is maintained in constant contact with the cam 91 by a spring 158' the other end of which is connected to a portion of the popping chamber 28. The block 157 carries a mercury switch 159 which is connected in series with the switch 139 so that when current is interrupted through either switch 139 or 159 the motor 102 stops.

At the beginning of the operation the follower 158 is riding on a high point in the cam 91, as shown in Fig. 5, and the umbrella 150 is raised to the top of the popping chamber 28 as seen in Figs. 2 and 4. In this position the switch 159 is closed. The switch 159 remains closed until the cam 91 rotates to a low point 160 at which time the rotation of the block 157 has rotated the rod 152 causing the umbrella 150 to lower to a position shown in Fig. 3.

When the follower 158 reaches this low point 160 the block 157 has rotated through an angle sufficient to open the switch 159 and stop the motor 102. The motor remains stopped during the entire popping operation.

In normal operation when the corn in the popping basket 65 is completely popped, it raises the umbrella 150 sufficiently to rotate the block 157 enough to close the switch 159 to reactivate the motor. It has been found, however, as a safety measure only, to be very desirable to limit the time which the corn may remain in the hot oil. For that purpose a standard 163 is mounted on the arm 26 and carries a time clock 165. The clock is wound by a pin 166 projecting from the side of the cam 91 and is adapted to contact the follower 158 to close the switch 159 at the end of the predetermined time period in the event that the popping corn does not effect that function.

Figure 11:
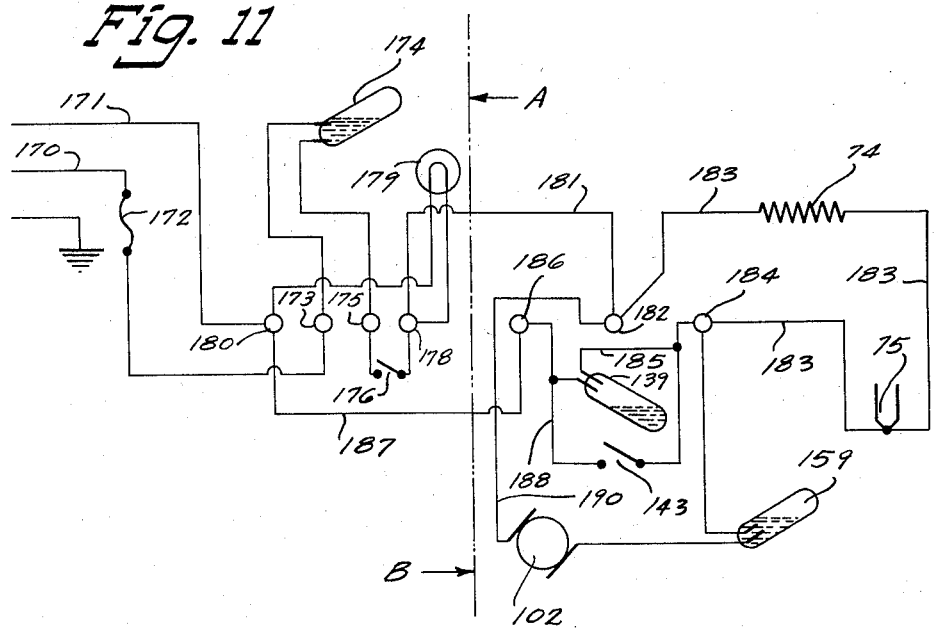
Fig. 11 is a wiring diagram showing electrical connections of the entire machine.
Figure 6:
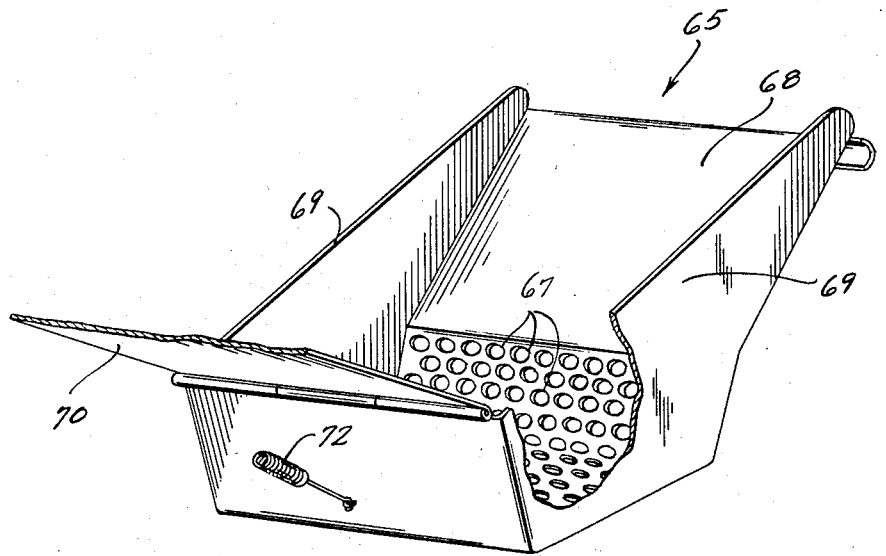
Fig. 6 is a perspective view of the corn popping basket, per se.

The electrical connections for the entire machine are shown in Fig. 11. The power comes into the machine through a pair of wires 170—171 and passes through a fuse 172 in the line 170. From the fuse 172 the power goes through a binding post 173 through a safety switch 174 which may be a mercury switch for convenience, thence through a second binding post 175 and through a main switch 176 which is preferably a snap switch actuated by a button 177 (Fig. 2) on the front of the machine. The power is then delivered to a binding post 178. From the binding post the power passes through a light 179, thence to a binding post 180 to complete the circuit through the wire 171. The specific method of operating the switch 174 will be given in detail below.

All the electrical equipment heretofore described in connection with Fig. 11 lies to the left of the line A—B and is situated on the left hand side of the machine. The following electrical equipment shown on the right of the line A—B is located on the right hand side of the machine.

From the binding post 178 a line 181 leads from the left hand side of the machine to a binding post 182 on the right hand side of the machine.

A power line 183 leads from the binding post 182 to the heating coil 74 thence to the thermostat 75 to a binding post 184. From the binding post 184 the current travels through a line 185 and through the switch 139 actuated by the cam 92 to a binding post 186. From the binding post 186 the current travels through the line 187 to the binding post 180 and thence to the line 171 to complete the circuit. Thus as long as the switch 139 is closed current flows through the heating coil 74, and conversely when the switch 139 opens power is cut off from the heating element 74. The switch 139 has a switch 143 shunted around it through a line 188 so that when either switch 139 or 143 is closed, current passes between the binding posts 184 and 186.

It will also be noted that power to the heating coil 74 is controlled by the thermostat 75 in such a manner as to limit the temperature of the oil to a predetermined maximum.

A second power line 190 from the binding post 182 leads to the motor 102 thence through the mercury switch 159 on the cam 91 to the binding post 184. From the binding post 184 the current must pass through either the switch 139 or 143 to return through the line 187 to the line 171. It will thus be apparent that the switches 139 and 159 are in series with the motor 102 and hence both switches 159 and 139 or the switches 159 and 143 must be closed in order to actuate the motor 102.

Figure 7:
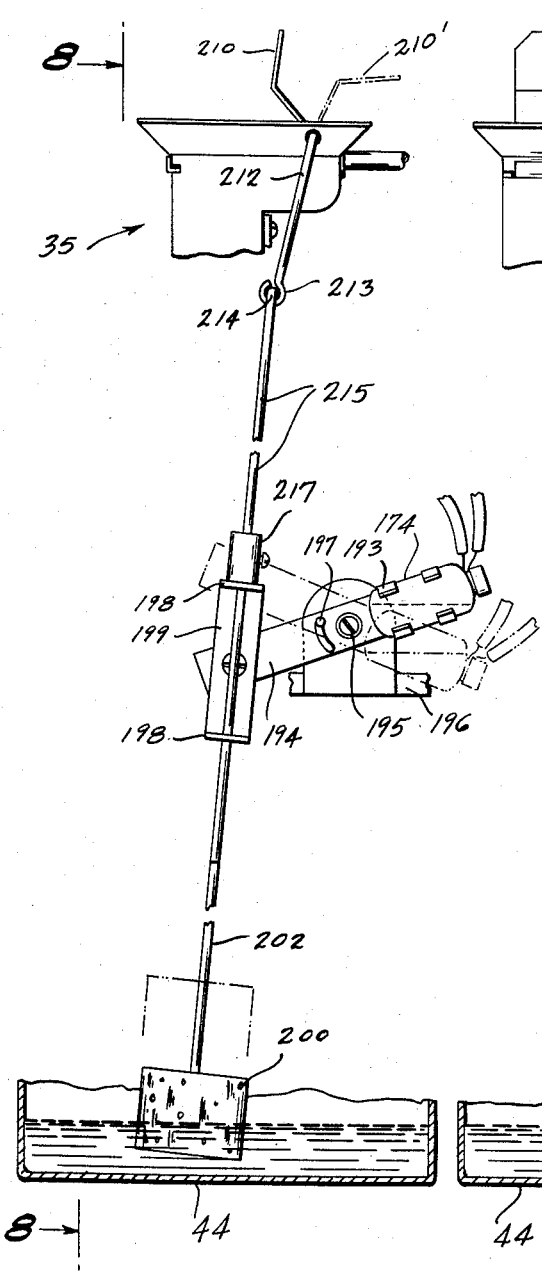
Fig. 7 is a detail of the safety cutoffs used to shut down the machine upon depletion of oil or corn supplies.
Figure 8:
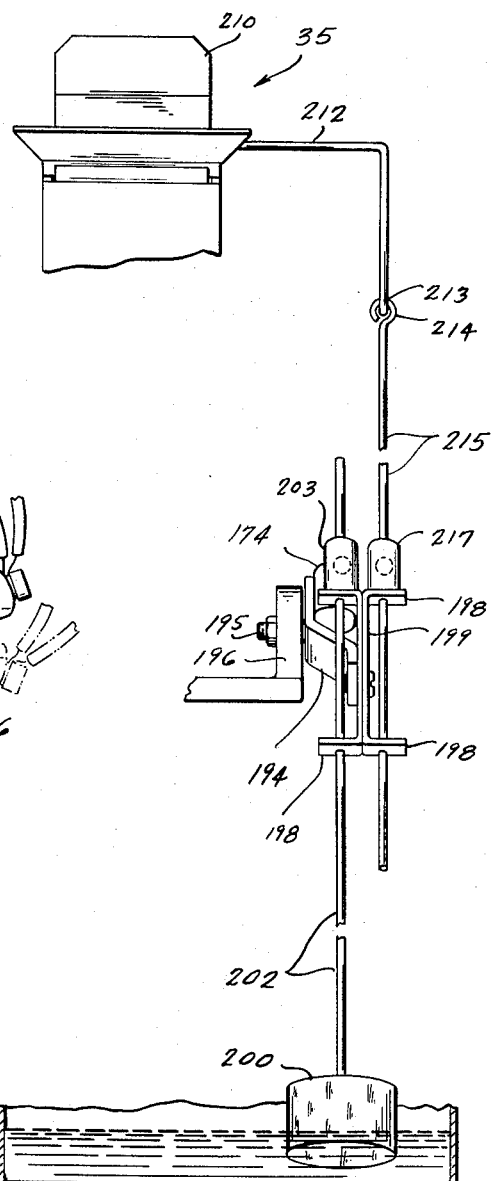
Fig. 8 is a view taken on the line 8—8 of Fig. 7, looking in the direction of the arrows.

Referring to Figs. 7 and 8 for details of the safety switch 174, it will be seen that the mercury tube switch 174 is carried in clips 193 formed on a metallic strip 194. The strip 194 is pivoted at 195 to a bracket 196 so that the weight of the tube 174 tends to cause that end of the switch to drop down into closed position. The rotative movement of the switch 174 about the pivot 195 is limited by a stop 197.

The end of the strip 194 has an H shaped bracket, comprising a pair of parallel legs 198—198 and a vertical cross piece 199, pivoted to it at the center of the cross piece 199.

A float 200 in the tank 44 has a rod 202 attached thereto which passes through holes in both legs 198—198 on one side of the cross piece 199. The rod 202 has a weight 203 (Fig. 8) attached thereto which is adapted to contact the top of the leg 198 as the level of the oil drops and raise the mercury tube 174 to open the switch.

In order to stop the action of the machine when the supply of corn in the bowl 90 gets too low, a paddle 210 is mounted in the entrance of the supply hopper. The paddle 210 is pivotally mounted on a rod 212 which extends horizontally through the side of the hopper 35 and is bent down and provided at its lower end with a hook 213.

The hook is engaged in an eye 214 on a rod 215. The rod 215 depends from the hook and passes through a pair of holes in the opposite sides of the legs 198—198 from the rod 202. A weight 217 is secured to the rod and is adapted to contact the top of the leg 198 in the event the level of corn in the hopper 35 becomes too low.

In practice the paddle 210 is held in the dotted line position 210' by the weight of corn on top of it, and moves to the solid line position 210 under the influence of the weight 217 when the weight of the corn is removed. Pressure of the weight 217 on the top of the leg 198 rotates the tube 174 counter-clockwise to open the switch and cut off all current to the machine.

It will thus be seen that either a deficiency of oil or corn will cause a shut down of the machine.

*Operation*

At the beginning of the operation the switches 139, 143, 159 and 176, the popping basket 65 and the glass door 55 are in the position shown in Figs. 2 and 5 and the electrical connections are as shown in Fig. 11.

To start the machine the knob 177 is turned, closing the main snap switch 176. If there is corn in the bowl 90 and oil in the tank 44, the safety switch 174 will be closed and the light 179 will then light. The machine is then "live" but does not start operation since both the switches 139 and 143 are open, preventing current from reaching either the motor 102 or the heating coil 74.

When it is desired to pop a batch of corn the switch 143 is closed by pressing the button 145 inwardly thus completing the circuit through the switch 143 to the coil 74 and to the motor 102. This starts the coil heating to heat the oil in the cooking chamber 31. At the same time the motor 102 starts, pumping oil from the tank 44 through the pipe 45, through the pump 43, through the pipe 46 and into the well 42, excess oil draining out the overflow pipe 48 and back into the tank 44. As the oil is pumped to the well 42 a portion of the oil in the well enters the cooking chamber 31 through the slot 40 to form a coolant at the ends of the cycle.

Simultaneously with the heating of the oil the motor turns the cams 91 and 92 on the shaft through the train of gears including 103, 104, 107, 110, 111 and 97.

As the cams 91 and 92 turn in the direction of the arrow 134, shown in Fig. 5, the follower 126 moves outwardly moving the arm 138 to the right as seen in Fig. 5, causing the slope of the tube to reverse and the mercury in the tube 139 to close the switch. After the switch 139 is closed the pin 140 then contacts the lever 141 to move that lever into contact with the button of the switch 143 to open that switch. From this point the switch 139 carries the current in place of the switch 143.

The movement of the cams 91 and 92 moves the lever 128 counter-clockwise, as seen in Fig. 5, to rotate the main shaft 60 causing the popping basket 65 to move down into the oil. As the basket moves down into the oil the link 130 moves down rotating the shaft 57 to close the glass door 55 which is secured to the shaft 57.

As the cams 91 and 92 rotate, the cam follower 158 bears against the cam surface of the cam 91, maintaining the switch 159 closed, thus keeping the motor running. As the follower 158 approaches the portion 160 of the cam 91, the block 157 is rotated by movement of the follower 158 inwardly thus turning the rod 152 and lowering the umbrella 150 to the position shown in Fig. 3.

The pin 114 fixed to the cam 92 moves around with the cam and after the basket 65 is in the oil in the cooking chamber 31, the pin moves the lever 115 counter-clockwise, as seen in Fig. 5, rotating the shaft 82 against the action of the spring 122. Rotation of the shaft 82 causes a similar rotation of the gate 81, opening the gate and allowing the corn in the measuring chamber 78 to drop into the oil in the popping basket 65.

When the pin 114 passes the lever 115 the spring 122 returns the lever 115 to its former position closing the gate 8. The plate 70, being in constant contact with the back wall 37 of the popping chamber 28, prevents corn from entering the oil in the cooking chamber 31.

As the pin 114 moves past the lever 115, it contacts the lever 119, moving that lever to the right, as seen in Fig. 5, or to the left, as seen in Fig. 2, to move the rod 85 to the right (Fig. 2). Moving the rod 85 to the right slides the plate 79, forming the gate, through a slot in the hopper to open that gate and allow corn to flow from the bowl 90 through the supply hopper 80 to fill the measuring chamber 78. After the pin 114 passes the lever 119, the spring 122 closes the gate 79 leaving the measuring chamber 78 with the required amount of corn for the next popping.

It will be noted that the gate 79 is spaced slightly above the upper edge of the rib 86 and that the upper edge of the rib is above the bottom 87 of the supply hopper 80. This construction insures the filling of the measuring chamber 78 and assures the closing of the gate 79.

When the umbrella is in the above-referred to position shown in Fig. 3 in the popping chamber the tube has tipped sufficiently to break the circuit through the mercury tube switch 159 thus cutting off current to the motor 102 and stopping rotation of the cams, while at the same time maintaining heat on the coil 74 to pop the corn.

When the corn is fully popped its expansion in volume raises the umbrella 150 slightly. Raising the umbrella rotates the rod 152 clockwise, as seen in Fig. 5, to close the switch 159 and reactivate the motor 102, causing the cams 91 and 92 to rotate further.

Rotation of the cam 91 causes further rotation of the rod 152 clockwise to raise the umbrella 150 to the position shown in Fig. 4.

As the cam 92 rotates the follower 126 is riding on the peripheral surface 125. When the follower 126 drops off the step 220 onto the surface 135 the shaft 60 is rotated a slight amount clockwise (as seen in Fig. 5). Rotation of the shaft 60 in that direction (counter-clockwise as seen in Fig. 4) raises the popping basket 65 out of the oil in the cooking chamber 31 and permits the excess oil to drain from the corn as the cam moves with the follower on the surface 135.

During the time the corn is draining the oil pump continues to run to supply fresh oil to the oil well 42 thus cooling the oil in the cooking chamber 31.

When the cam rotates sufficiently to drop the follower 126 into the recess 133 the popping basket 65 is rotated and stopped with a snap at the same time the glass door 55 opens to eject all the corn from the basket into the hopper 19.

Corn is removed from the hopper by opening the gate 20 and permitting the corn to slide out by gravity.

In the event that excess oil is retained on the basket after the draining and runs down the tray 68 it follows around the shaft 60 and is returned to the oil well 42 for reuse.

It will be realized that the hereinbefore described form of the invention is merely a preferred embodiment thereof and that various changes in size, shape and arrangement of parts may be made without departing from the spirit of the invention or the scope of the subjoined claims.

I claim:

1. In an automatic corn popping machine of the character described, the combination with an electric heater, a popping basket, and an electric motor connected to said basket for moving it in a cycle including one position in which the corn is popped and another position in which the basket is tilted to eject popped corn, of an electric control circuit for said motor and heater including branch circuits for said motor and heater connected in parallel, said motor branch including a first switch in series with said motor whereby said motor may be de-energized independently of the heater, and a second switch in series connection with both said branches for simultaneous control of said motor and heater.

2. The device of claim 1 in further combination with a third switch in parallel with said second switch whereby closure of either said second or said third switch will energize said heater and said motor subject to the control of said first switch.

3. The device of claim 2 in which said third switch comprises a starting switch having means for its manual closure to initiate operation of the machine to energize said motor to move the basket to popping position and means for opening said third switch, said means being actuated on closure of said second switch whereby said second switch will maintain said circuit closed despite the opening of the third switch, said second switch being provided with means for its closure upon movement of the basket to popping position, and means for opening said second switch on movement of said basket to ejecting position whereby to conclude operation of the machine and de-energize said heater and motor.

4. In an automatic corn popping machine of the character described, the combination with an electric heater, a popping basket, and an electric motor connected to said basket for moving it in a cycle including one position in which the corn is popped and another position in which the basket is tilted to eject popped corn, of an electric control circuit for said motor and heater including branch circuits for said motor and heater connected in parallel, said motor branch including a first switch in series with said motor whereby said motor may be de-energized independently of the heater, and a second switch in series connection with both said branches for simultaneous control of said motor and heater, in further combination with means for opening said first switch to deactuate said motor after said basket is in popping position whereby said basket will remain in popping position during continued operation of said heater, and means for reclosing said first switch after the corn is popped to reactuate said motor to move it to ejecting position.

5. The device of claim 4 in further combination with an oil bath heated by said heater, an oil storage tank and circulating connection between said tank and bath, and a pump driven by said motor for circulating oil from the tank to the bath and return, said bath being cooled by circulating oil at all times the pump and motor are actuated before and after the basket is in popping position, the pump being deactuated and oil circulation being cut off, however, during popping when the motor is deactuated whereby to raise the oil bath to proper popping temperature.

6. The device of claim 4 in which the means for reclosing the first switch includes means actuated by the expansion of the popped corn.

7. In a corn popping machine of the character described and including means for the delivery of unpopped corn from a hopper to a heater below the hopper, an oil bath containing oil heated by the heater and an electric circuit for energizing said heater, said circuit including a motor for actuating the corn delivery means, the combination with a safety switch in said circuit for preventing operation of said motor and said heater when either the supply of oil or the supply of unpopped corn falls below a predetermined minimum, of means for operating said switch, said means comprising a switch actuating arm whose movement in one direction closes the switch and movement in another direction opens the switch, motion transmitting connections to said arm responsive to the level of oil in said storage tank and motion transmitting connections to said arm responsive to the level of unpopped corn in said hopper, the movement of either of said connections being such as to move said arm in said other direction to open the switch when the level of oil drops below a predetermined minimum or the level of unpopped corn in the hopper drops below a predetermined minimum, the opening of said switch being effective to preclude operation of said motor and heater.

8. The device of claim 7 in which said arm is provided with a central pivot, a relatively constant weight at one side of the pivot to bias the arm in said one direction to close the switch, said motion transmitting connections comprising weights at the other end of the arm which are normally held away from weight bearing pressure against said arm when the oil and unpopped corn levels are above said predetermined minimums, said weights being lowered against said arm to overbalance the weight first mentioned to open said switch when either or both of said levels drop below said predetermined minimums.

9. The device of claim 8 in which said motion transmitting connections comprise a float in said oil bath and a float rod projecting upwardly from said float toward its weight, and a paddle in said hopper having a pivoted mounting, a rod connected from the paddle to its weight, said paddle being biased in one direction about its mounting by the pressure of unpopped corn to hold its weight away from the arm but releasable in the absence of pressure of unpopped corn to move in the other direction to lower said weight against said arm, said arm being provided with a bracket pivotally connected thereto and having ways in which said float and paddle rods are slidable, said weights being fixed on said rods to be disposed above the level of said ways when said levels are above said pre-determined minimums, but will be lowered on said rods against said ways when said levels drop below said predetermined minimum to oscillate said arm about its pivot.

10. The device of claim 9 in which said bracket comprises an H-shaped member having a central web pivotally connected to said arm and leg members extending in opposite directions from said central web at each side thereof, said legs having aligned apertures through which said rods are guided to constitute said ways.

11. In an automatic corn popping machine of the character described including a popping basket having an articulate mounting, a heater and a motor to move the basket on its mounting from a popping position over said heater to an ejecting position away from said heater, and a switch for said motor, an umbrella provided with an independent mounting over said basket and yieldable upwardly on said mounting under pressure of expanding popped corn, a connection between said umbrella and said switch whereby upward movement of the umbrella will close said switch to actuate the motor to move the basket to its ejecting position, the normal position of the umbrella prior to raising thereof by expansion of popped corn being such as to hold the switch open to deactuate said motor.

12. The device of claim 11 in which said articulate mounting comprising a pivot pin on which the basket is swingable, the mounting for the umbrella also comprising a pivot on which it is swingable in the same general direction as the basket.

References Cited in the file of this patent

UNITED STATES PATENTS

| | | |
|---|---|---|
| 1,808,758 | Bettandorff | June 9, 1931 |
| 1,844,260 | Nicolino | Feb. 9, 1932 |
| 2,549,449 | Gibson | Apr. 17, 1951 |
| 2,587,338 | Lee et al. | Feb. 26, 1952 |
| 2,674,936 | Martin | Apr. 13, 1954 |